May 23, 1967  H. MEIER  3,320,788
APPARATUS FOR WINDING ELECTRICAL COILS
Filed Oct. 20, 1964
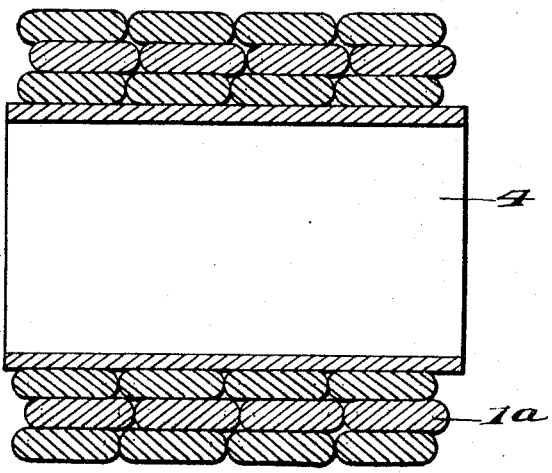
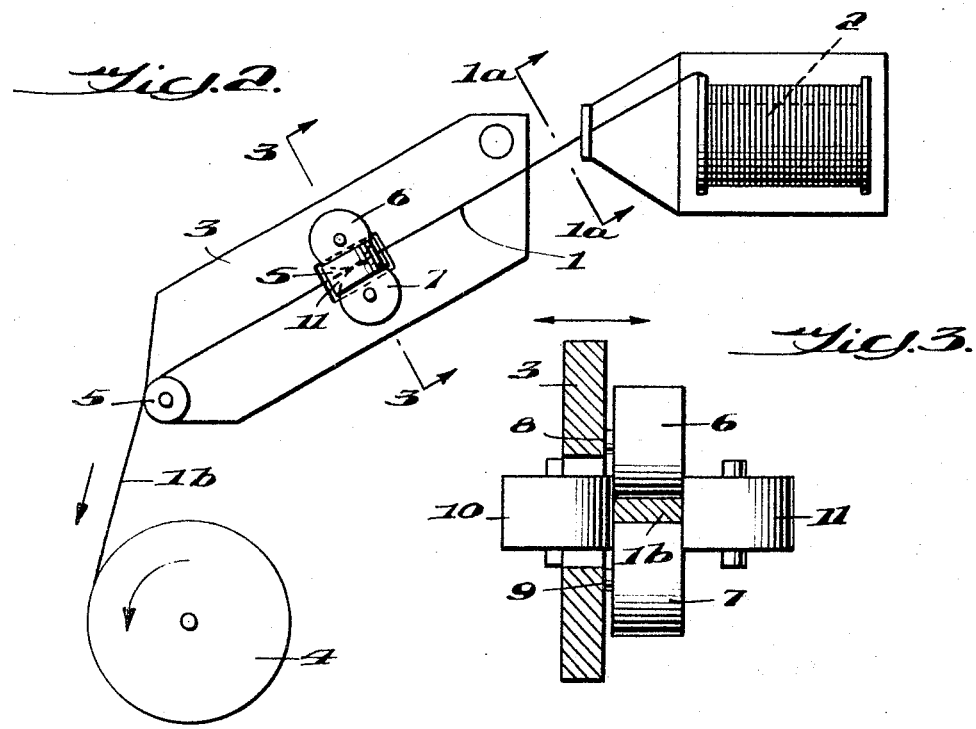
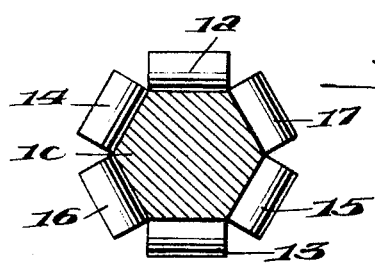
INVENTOR
Hans Meier
BY Pierce, Scheffler & Parker
ATTORNEYS

United States Patent Office

3,320,788
Patented May 23, 1967

3,320,788
APPARATUS FOR WINDING ELECTRICAL COILS
Hans Meier, Muri, Switzerland, assignor to Micafil A.-G., Zurich, Switzerland, a joint-stock company
Filed Oct. 20, 1964, Ser. No. 405,222
Claims priority, application Austria, Dec. 19, 1963, A 10,251/63
2 Claims. (Cl. 72—224)

The present invention relates to the manufacture of coils for use in electrical control apparatus such as relays, solenoids and the like and in particular to an improved method of, and apparatus for, winding such coils.

In winding electrical coils of this type on conventional winding machines the long established procedure has been to use round wire, that is to say wire which has a circular cross section. However, in the case of coils having a plurality of layers superposed upon each other, an accurately wound finished product is achieved only with the use of sleeves of insulating material, usually a special paper, intermediate adjacent layers. Generally speaking, coils wound in this manner make relatively poor use of the winding space available on the spool. The so-called winding space factor is thus considerably less than optimum.

In order to improve the space factor, a so-called orthocyclical winding technique has been developed which reduces to practically nothing the gaps between adjacent turns of a layer. Only where the necessary jumps to the next winding take place is there any space remaining between the turns of adjacent superposed winding layers. However, in practice, coils of the orthocyclical type can be produced only one at a time because this method involves a highly precise method of winding.

With all known methods of winding coils from round wire, pressures from the wires in the axial direction of the coil are developed due to radially inward pressure of the wire turns in one layer which are accommodated somewhat between adjacent turns on the layer directly underneath and which therefore tend to separate axially the turns of the underneath layer. When the coils forms are provided with end flanges, such axially exerted pressures therefore tend to bend and deform the flanges outwardly. Moreover, wire coils wound from round wire according to prior known techniques are mostly not self-supporting from a structural point of view.

It has also been known to wind wire coils from wire having a rectangular cross-section, the rectangularly configured wire being drawn off a supply spool on which it had been stored in that form. However, this technique involves difficulties in wire-guiding which thus make it difficult to wind the rectangular wire onto the coil form.

The object of the present invention is thus to provide an improved apparatus for winding electrical coils which avoids most of the disadvantages of the prior known techniques. In general, this is accomplished by starting with conventional, round wire on a supply spool, drawing the wire from the spool through sets of deforming rolls which convert the initially round cross section of the wire into a flattened oval or polygonal such as rectangular, or hexagonal cross-section, and then winding the deformed wire onto the coil form, usually a spool, in the desired number of layers until the desired number of coil turns have been established. With this improved technique, and using wires of flattened oval, or rectangular cross-section the flat sides of the turns of adjacent layers come to lie directly against one another, in a slightly axially displaced relation, and the pressure exerted from one winding layer to another layer beneath due to the winding tension in the wire is entirely radially inward. There is no force component acting in an axial direction and hence there is no axial pressure exerted in opposite direction against end flanges on the coil form, if these are provided. The coil layers thus become "self-supporting" and consequently it is no longer necessary to use insulating sleeves between layers of the coil being wound. The wire itself can be varnished copper and test results on the deformed wire after winding into coil form were found to be essentially as good as those in which the coil was wound from undeformed round wire.

Moreover, by utilizing the improved coil winding technique according to the invention, and with the wire in a flattened oval or rectangular form only the winding turns of directly successive layers touch one another, i.e., the winding turns of alternate layers such as layers such as the first, third and fifth, etc., cannot possibly contact one another. In the case of wire deformed into certain polygonal forms such as hexagonal, axial force components do arise on the successive layers as these are being wound but such forces can be met by using end flanges having the required strength to stand these forces which would otherwise tend to cause the flanges to be deformed. When winding with round wire converted by rolling to hexagonal cross-section, the winding space factor can be brought to an optimum by providing wedge-shaped grooves in the core part of the flanged spool which have a configuration complementary to the downwardly facing wedge-shaped parts of the hexagonal wires of the first winding layer on the spool. When the coils are wound from round wire deformed to rectangular or hexagonal cross-section, the space on the coil form available for receiving the coil turns is utilized to almost 100%. A very favorable space utilization factor is also obtained when the wire is deformed into a flattened oval cross-section, i.e., one with flat sides and slightly rounded ends.

The winding technique according to the invention offers, in addition to the above-noted advantages, the following: Special calibration of the wire size is no longer necessary since the deforming rolls themselves calibrate the wire to the precise dimensions desired for winding; conventional round wire of varnished copper which is usual in the trade can be employed; and the deforming rolls themselves can be power driven to thereby minimize the possibility of wire breaks in guiding the wire from the supply spool onto the coil form.

The foregoing, as well as other objects and advantages inherent in the invention will become more apparent from the following description of one suitable embodiment and from the accompanying drawings wherein:

FIG. 1 is a view in longitudinal central section through a coil form having a plurality of winding layers thereon and wherein the round wire on the supply spool used as the starting material has been deformed into a flattened oval cross-section by the deforming rolls after being drawn off the supply spool;

FIG. 1a is a view taken on line 1a—1a of FIG. 2; showing the circular configuration of the wire as it is pulled from the supply spool;

FIG. 2 is a side view showing a portion of the wire guide structure with wire deforming rolls thereon;

FIG. 3 is a sectional view taken on line 3—3 of FIG. 2 and

FIG. 4 is a view showing the deforming roll set-up on the wire guide for deforming the initially round wire into hexagonal cross-section prior to winding.

With reference now to the drawings, and to FIG. 2 in particular, the coil forming device is seen to be comprised of an operating group which includes a supply spool 2 from which the wire 1 in round form is pulled. Associated with the supply spool 2 is a wire guide device comprising a plate 3 which forms a support for the rolls which are to deform the wire from its round cross section after leaving the supply spool 2. The wire guide is usually mounted on a carriage, not illustrated since this is conventional, for reciprocating movement, in the direction indicated by the double ended arrow in FIG. 3, with respect to the rotationally driven coil form 4 on which the deformed wire is to be wound in layers after passing over the guide roll 5.

As indicated, the wire deforming rolls are carried by the support plate 3 and the number and arrangement of rolls will be dictated by the particular cross-section desired for the deformed wire.

If a flattened oval cross-section 1a is desired for the wire, as shown in FIG. 1, then the deforming rolls will be constituted simply by a pair of rolls 6 and 7 mounted on stub axles 8 and 9 which extend laterally from one side of support plate 3. The distance between these rolls will of course depend upon the particular calibrated thickness desired for the wire. The rolls 6 and 7 may be mounted for free running on their axles as the wire is pulled between them and onto the rotationally driven coil form 4 or they may be power driven by means, not shown, if it is desired to minimize the chance for wire breakage.

If a rectangular cross-section 1b is desired for the wire as shown in FIG. 3, then another set of rolls 10 and 11 will be provided in addition to rolls 6 and 7. The other rolls 10 and 11 will likewise be supported for rotation on support plate 3 by suitable means, not illustrated, for rotation about parallel, spaced axes which are perpendicular to the parallel spaced axes of rotation of the other set of rolls 6 and 7. The respective distances between the rolls of the two sets of rolls 6, 7 and 10, 11 are preferably made adjustable so that a rectangular deformed wire 1b of any desired calibrated width and thickness can be established between the rolls and passed on to the coil form 4.

If one desires to deform the round wire 1 into a polygonal cross-section, for example, hexagonal, then three sets of rolls would of course be provided. This is illustrated in FIG. 4, wherein the roll sets are indicated by 12 and 13, 14 and 15, and 16, 17. The deformed wire of hexagonal cross-section is indicated at 1c.

I claim:

1. In a coil winding machine wherein an electrical coil is wound in a layer-by-layer manner onto a rotating coil form from wire drawn from a supply spool and wherein a reciprocating guide is interposed between the supply spool and coil form for guiding the wire onto the latter, the improvement wherein at least one set of spaced flattening rolls is mounted on said wire guide and between which the wire initially in round form on said supply spool is pulled and deformed into a calibrated flattened cross-section having at least two oppositely disposed parallel flattened sides.

2. The improvement for a coil winding machine as defined in claim 1 and which further includes a guide roll on said wire guide over which the deformed wire passes to said rotating coil form after leaving said set of flattening rolls.

References Cited by the Examiner

UNITED STATES PATENTS

| | | | |
|---|---|---|---|
| 2,341,916 | 2/1944 | Hansen | 80—34 |
| 2,495,387 | 1/1950 | Rummins | 72—224 |
| 2,734,695 | 2/1956 | LeBus | 82—5 |

FRANCIS S. HUSAR, *Primary Examiner.*